United States Patent
Hsiao

(10) Patent No.: US 8,033,290 B2
(45) Date of Patent: Oct. 11, 2011

(54) STANDING PIPE FAUCET ASSEMBLY

(76) Inventor: Hui-Fen Hsiao, Changhua (TW)

( * ) Notice: Subject to any disclaimer, the term of this patent is extended or adjusted under 35 U.S.C. 154(b) by 470 days.

(21) Appl. No.: 12/248,158

(22) Filed: Oct. 9, 2008

(65) Prior Publication Data

US 2009/0101221 A1 Apr. 23, 2009

(30) Foreign Application Priority Data

Oct. 19, 2007 (TW) .............................. 96217574 U

(51) Int. Cl.
*F16K 27/00* (2006.01)
(52) U.S. Cl. .................. 137/315.12; 137/801
(58) Field of Classification Search .................. 137/801, 137/315.12, 15.02, 625.4, 625.41, 602, 603; 4/675–678

See application file for complete search history.

(56) References Cited

U.S. PATENT DOCUMENTS

| | | | |
|---|---|---|---|
| 6,712,094 B1 * | 3/2004 | Chen | 137/801 |
| 6,786,240 B2 * | 9/2004 | Ouyoung | 137/801 |
| 7,198,064 B1 | 4/2007 | Hsiao | |
| 7,484,524 B1 * | 2/2009 | Yu | 137/315.12 |

* cited by examiner

*Primary Examiner* — Craig Schneider

(57) ABSTRACT

A standing pipe faucet is formed from a faucet body shaped out of a hollow pillar, a separate body with a corresponding hole connecting it to the faucet body, and a slantwise threaded hole connecting water mixing valve to the assembly. A tube connects an outlet pipe through the hole groove. The tube has an outer diameter equal to the inner diameter of hole groove, and a length shorter than that of the hole groove. The tube corresponding to the threaded hole has a slantwise blocking groove. After the tube is inserted into the hole groove, a bolt is screwed in the threaded hole, generating a backward push between the bolt and the threaded hole, which fixes the outlet pipe and faucet body together. After the chamber has a water outlet through the tube, the whole assembly is completely assembled.

3 Claims, 5 Drawing Sheets

STANDING PIPE FAUCET ASSEMBLY

BACKGROUND

1. Field of the Invention

The present application claims priority of the corresponding Republic of China patent application no. 096217574, which was filed on Oct. 19, 2007 by the Intellectual Property Office under the Ministry of Economic Affairs of the Republic of China.

The present invention relates to a standing pipe faucet assembly, comprised of a faucet body and a separate body. The separate body contains a lateral hole groove through the side, and a chamber in its upper portion that holds a slantwise threaded hole attached to a mixing valve. A bolt screwed into the slantwise threaded hole will generate a backward push against a tube that is connected to the rear end of an outlet pipe inserted into the separate body's lateral hole groove. As the bolt penetrates deeper into the tube, it pushes the tube back further and fixes the outlet pipe and the faucet body together. A water outlet through the tube at the rear end of the outlet pipe completes the assembly. The assembly eliminates the need for the traditional welding fixation technique.

2. Description of the Related Art

Traditionally, in the manufacture of a standing pipe faucet assembly, the faucet body assembly includes a solid copper pillar and a separate body. The solid copper pillar is used for turning the structure of a chamber to accommodate a water mixing valve, and a separate body contains a hot and cold inlet water pipe. In addition, a water outlet pipe is connected laterally to the separate body through a drill hole. Finally, the water mixing valve is installed in the faucet body; the top of the valve includes a handle for controlling the ratio of cold and hot water as well as the flow rate.

The quality of a faucet body manufactured by a solid copper pillar is better than those manufactured by a traditional sand casting process, but the international copper price is very high, thus increasing the overall material cost. Furthermore, a large quantity of waste materials are produced during the manufacturing of the copper pillar, adding to the overall material cost. Such a standing pipe faucet does not comply with the cost-effective requirements of the industry and requires improvements.

The inventors of U.S. Pat. No. 7,198,064 B1 have provided a standing pipe faucet assembly in which a faucet body is slightly shaped by using a copper pipe assembled together with a separate body. A chamber is placed at the bottom portion of the separate body, where a water mixing valve is installed. A lateral hole groove on the lower portion of the separate body lines up with a through hole and outlet pipe on the faucet body. An inlet pipe interconnects the water mixing valve and an outlet pipe passing through the lateral hole groove.

Since the faucet body of the foregoing standing pipe faucet assembly is slightly shaped by using the copper pipe, it does not have enough thickness to place related structures, such as threads, to connect the outlet pipe. Therefore, the faucet body and the outlet pipe need to be welded together, creating an unappealing welding mark, and thus decreasing the overall aesthetic quality of the standing pipe faucet assembly. Moreover, the welding quality is dependent on techniques and experiences of the workers, whose work will not maintain the same quality every time welding is performed. Such a standing pipe faucet is an imperfect design and requires improvements.

BRIEF SUMMARY

In view of the foregoing shortcomings of the prior art, consisting of a standing pipe faucet with the faucet body made of a copper pipe welded together with the outlet pipe, a modified standing pipe faucet is presented by the inventor. Based on years of experience in the related industry, the inventor came up with an improved standing pipe faucet assembly, where the faucet body is assembled together with the outlet pipe without a welding process. The assembly process is simplified while maintaining the overall quality of the standing pipe faucet.

Another objective of the present invention is to improve the overall sense of quality and aesthetic feeling of the design, by eliminating unappealing welding marks from the traditional process.

To achieve the foregoing objectives, the structural design of the invention is thus assembled as previously described.

BRIEF DESCRIPTION OF THE DRAWINGS

The features and advantages of the various embodiments disclosed herein will be better understood with respect to the following description and numbered drawings of the preferred embodiment of the present invention, and in which.

DETAILED DESCRIPTION

The structural assembly, technical measures, and functions of the present invention will become apparent in the following detailed description of the preferred embodiments using the attached drawings as reference.

Figure 1:
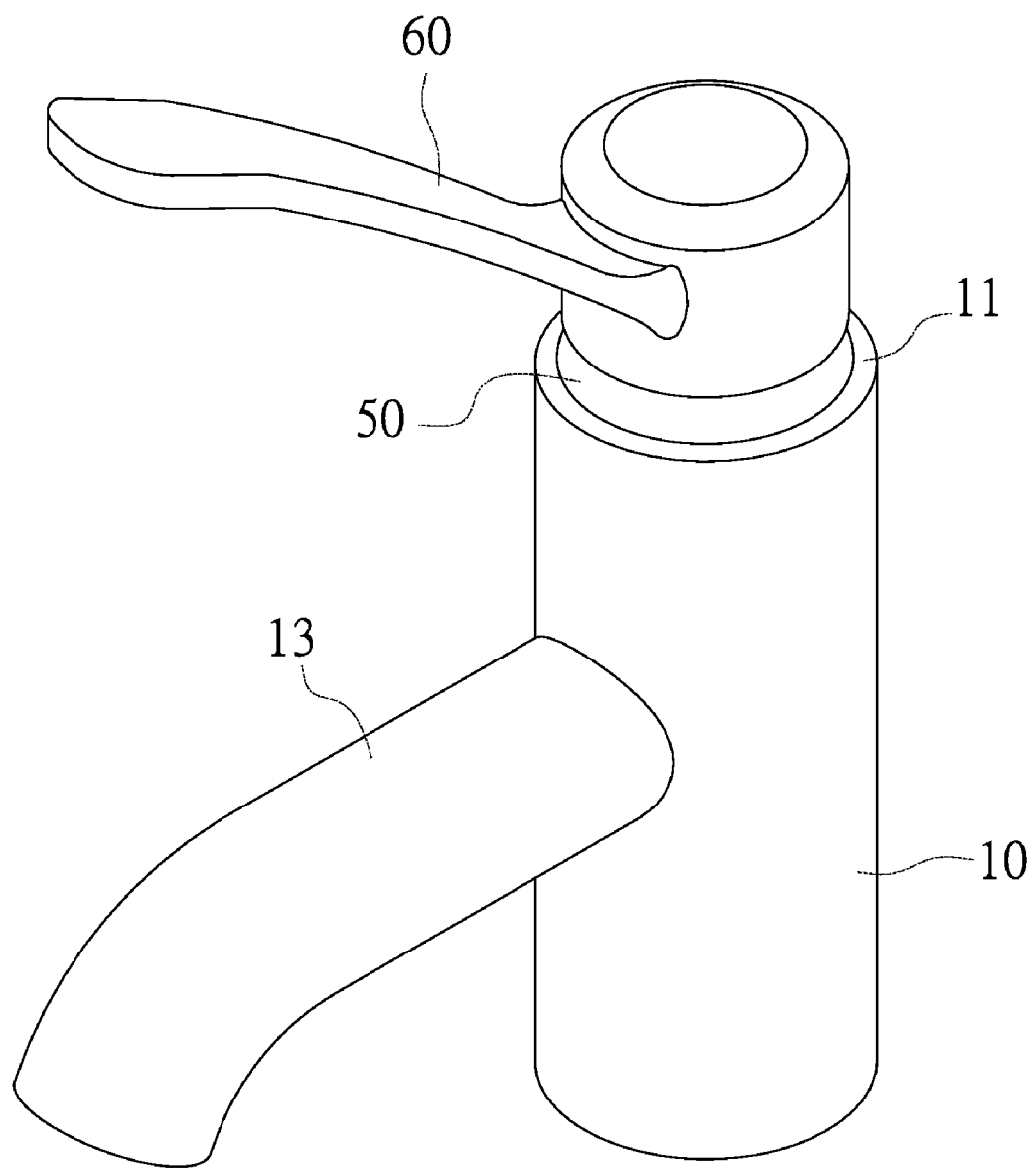
FIG. 1 is a schematic view of the structure.
Figure 2:
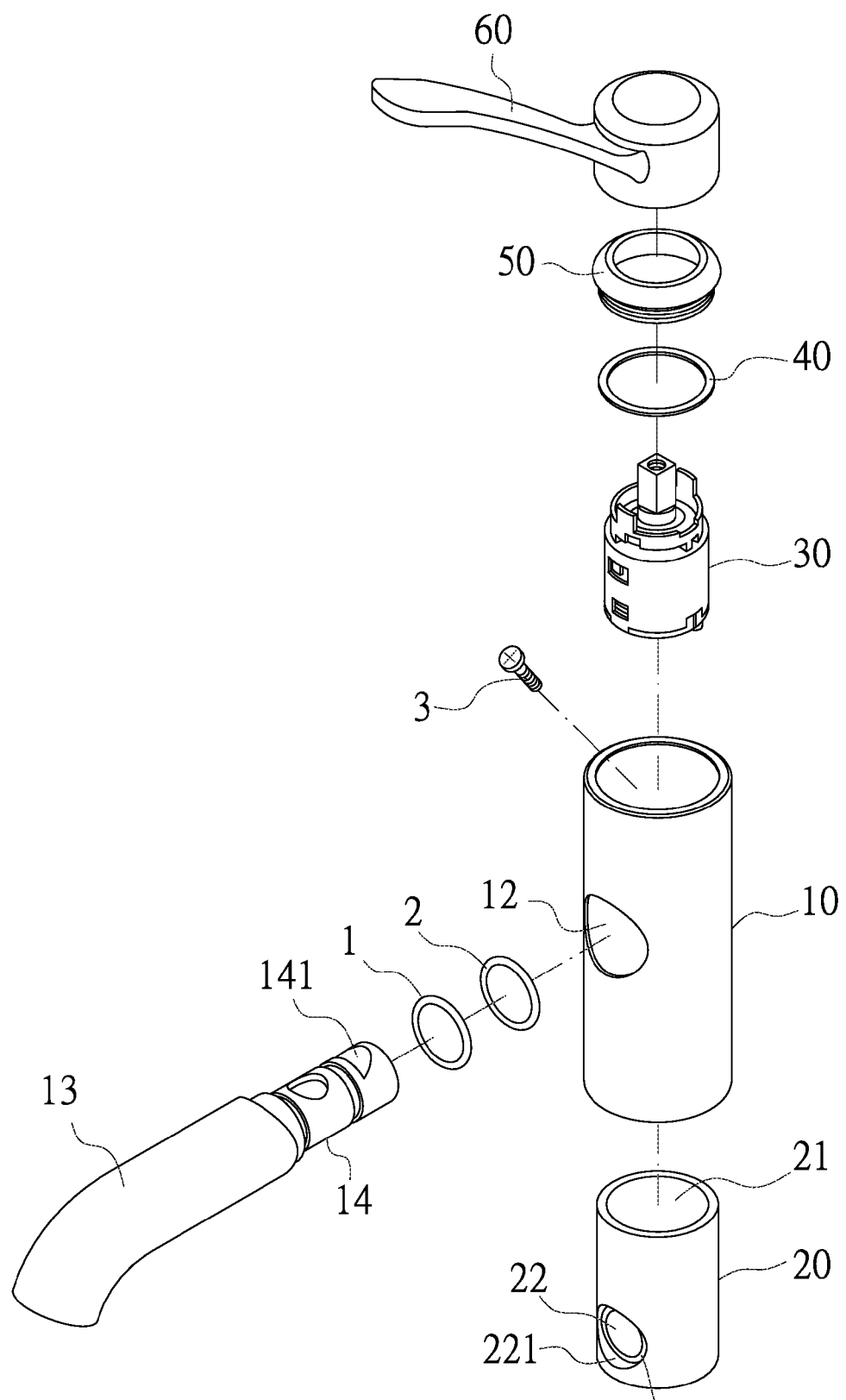
FIG. 2 is an exploded view of the structure.
Figure 3:
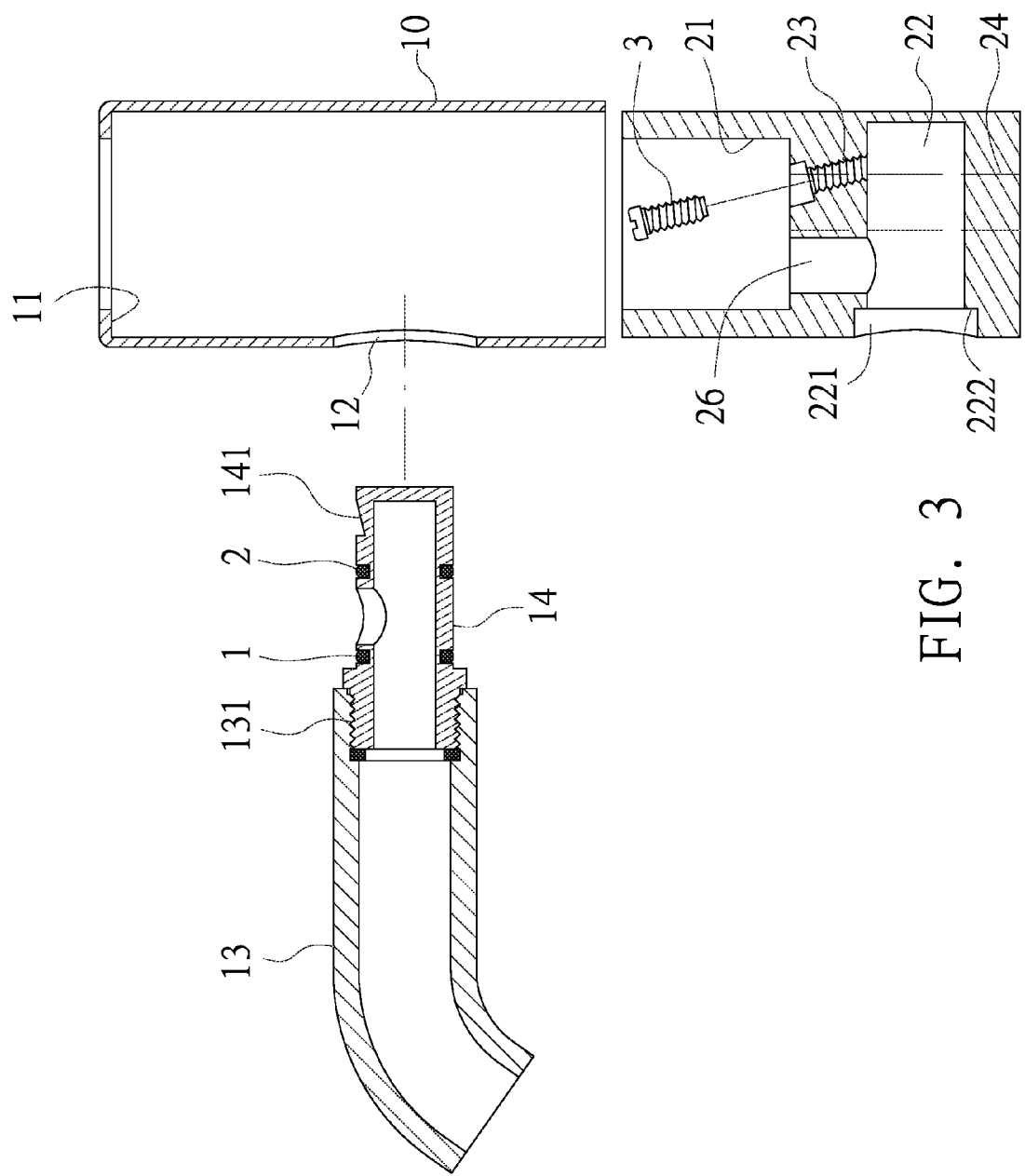
FIG. 3 is a planar structural relation view of an exploded state.
Figure 4:
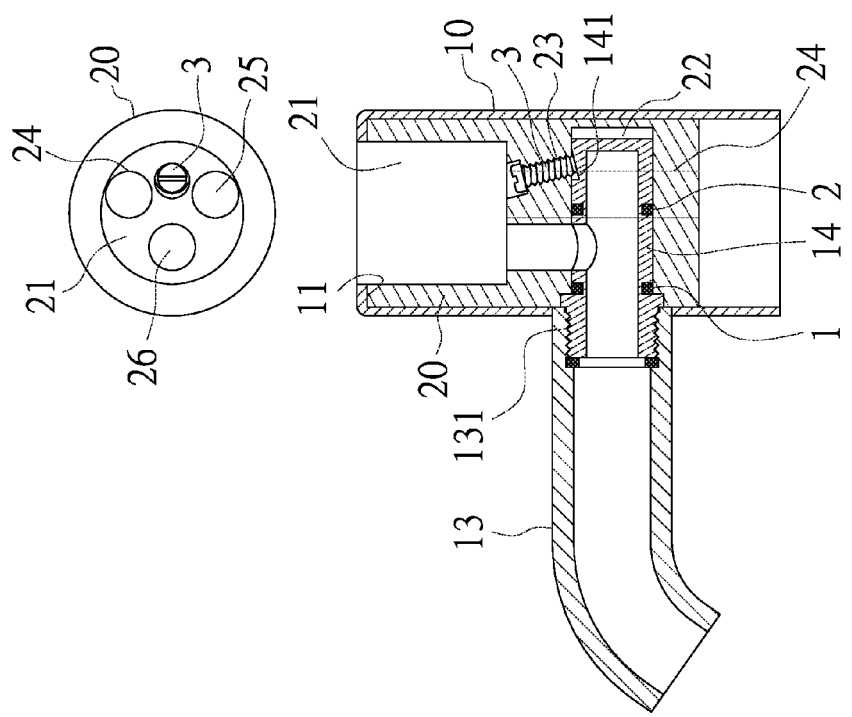
FIG. 4 is a planar structural relation view of an assembled state.
Figure 4:
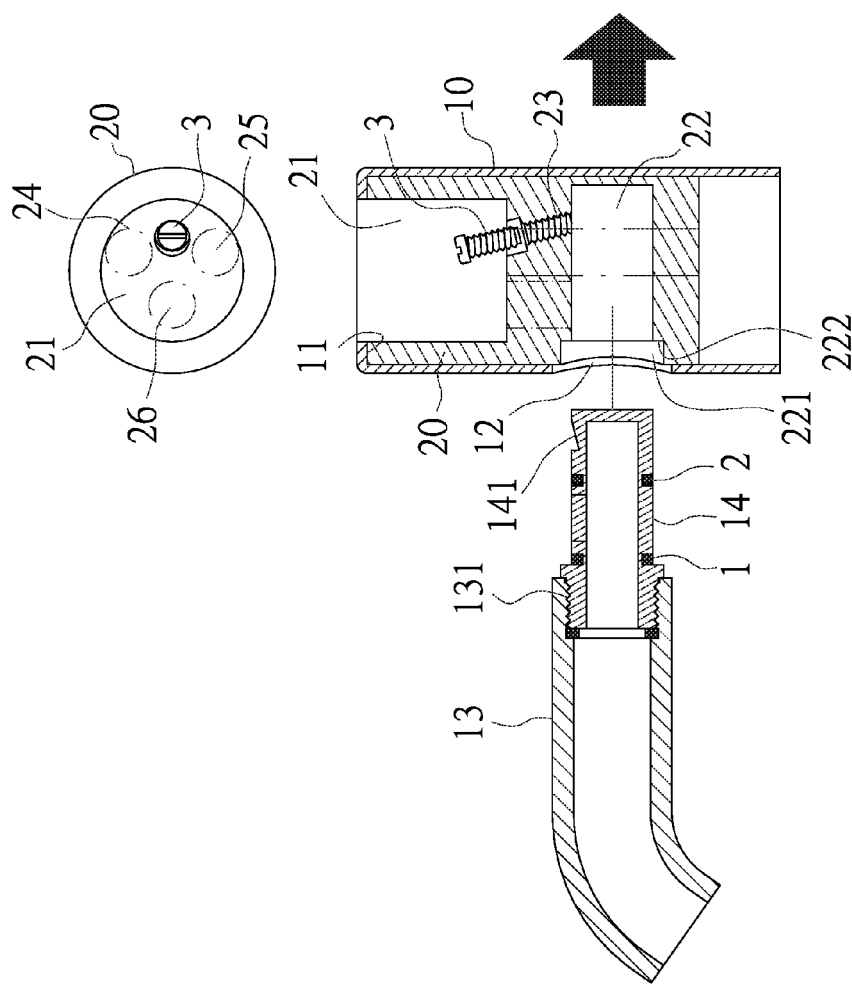
Figure 5:
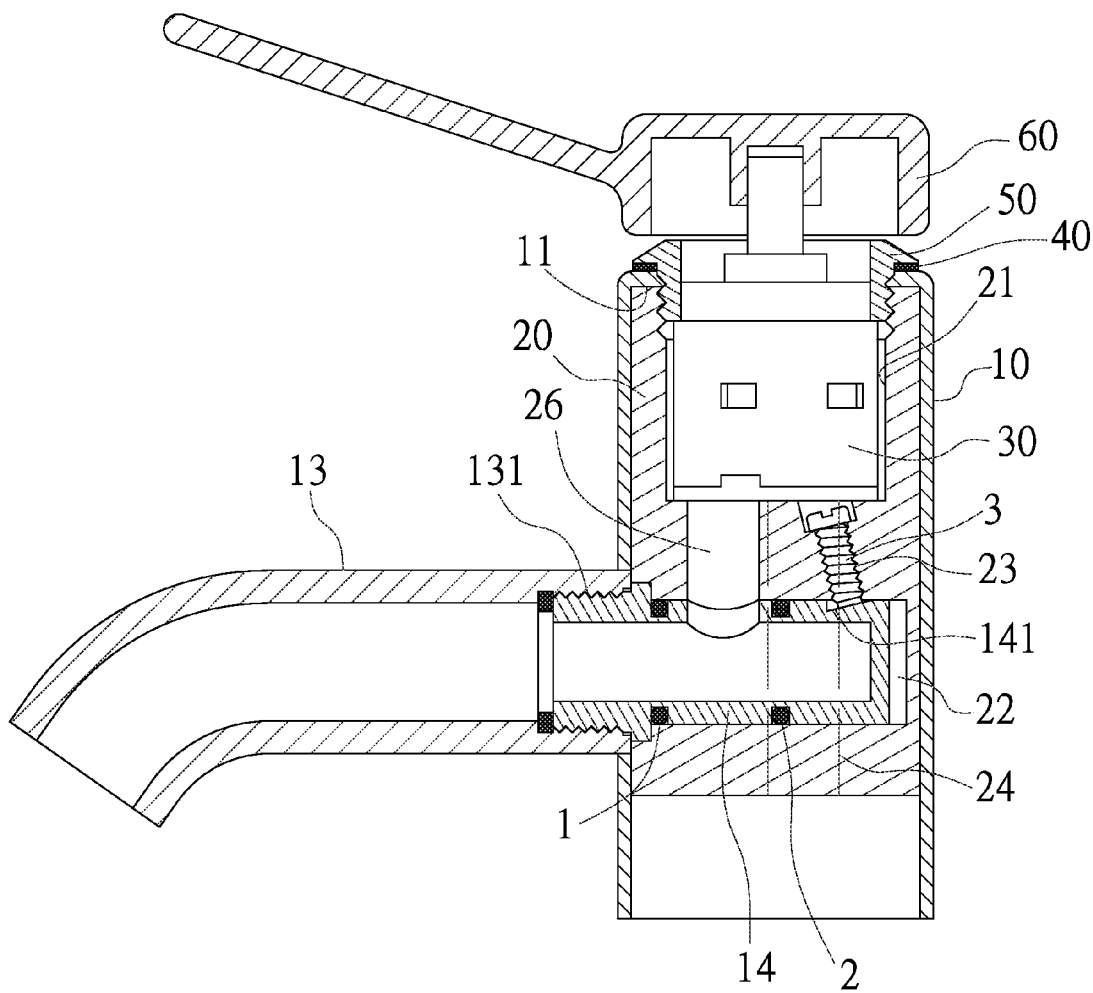
FIG. 5 is a schematic view of a structural relation of an overall structure.

Referring to FIGS. 1-5, the structural design of a preferred embodiment is comprised by the shaped copper faucet body 10, the separate body 20, and a blocking rim 11 that is stamped and formed at the top edge of the faucet body 10. When the separate body 20 is inserted into the faucet body 10 from the bottom thereof, a surrounding orientation engagement can be easily obtained. At the upper section of the separate body 20 is a chamber 21 for installing a water mixing valve 30. At its lower section lies a lateral hole groove 22, which has a expanding diameter groove section 221 and a step surface 222. The lateral hole groove 22 corresponds to a through hole 12 that is disposed at a lateral side of the faucet body 10. The corresponding holes are for assembling an outlet pipe 13. The chamber 21, holds the water mixing valve 30 which has a slantwise threaded hole 23 that passes through the rear portion of the lateral hole groove 22. At the rear of the outlet pipe 13, there is a screw section 131 used for assembling the tube 14. The outer diameter of the tube 14 is equal to the inner diameter of the lateral hole groove 22, while the length of the tube 14 is shorter than the length of the lateral hole groove 22. The rear end of the tube 14 is closed. Located on the tube 14 are two O-rings, 1 and 2, with 1 in the front and 2 in the back. Bolt 3 is screwed in the slantwise threaded hole 23 after the tube 14 is assembled in the lateral groove 22. At the rear end of tube 14 is a slantwise blocking groove 141; a backward push effect is generated between the end of the bolt 3 and the slantwise blocking groove 141 as the bolt penetrates the groove. As the bolt penetrates deeper, tube 14 pushes further back to connect the outlet pipe 13, the faucet body 10 and the separate body 20 together. The O-rings 1 and 2 hermetically engage in section 221, formed at the front end of the lateral hole groove 22. The chamber 21 of the separate body 20 has a cold water inlet 24 and a hot water inlet 25 that are staggered and isolated from the lateral hole groove 22. Also in the chamber lies a water outlet 26 passing through the tapered groove section 221. After a washer 40 is installed, a cap 50 is secured to fix the water mixing valve 30 into the chamber 21. Finally, a water control handle 60 is installed to complete the assembling of the overall standing pipe faucet assembly.

From the aforementioned structural design, the bolt 3 fits into the slantwise threaded hole 23 to push back tube 14. The backwards push motion effectively fixes the outlet pipe 13, the faucet body 10, and the separate body 20 together. Since the O-rings 1 and 2, installed on tube 14 have waterproof capabilities, no water can leak from the water outlet 26. Thus, the traditional welding technique for joining the faucet body 10 and the separate body 20 together can be avoided. By eliminating the welding technique in the present invention, quality is not questioned because of man-made factors, and the overall quality sense and aesthetic feeling is improved. As shown by the ease in assembly of the outlet pipe 13 through the lateral groove hole 12 on the separate body 10, the invention greatly improves the functional architecture of the standing pipe faucet.

Briefly summarized, the structural design of the pipe faucet assembly removes the need of a traditional welding technique for joining the faucet body and the separate body together and employs an assembly method to fixedly unite the faucet body and the separate body together. Thus, not only are the manufacturing and assembling processes simplified while maintaining quality, but also the overall quality sense and aesthetic feeling are improved. The invention is very useful to the industry and complies with the patent application requirements.

The above description is given by way of example, and not limitation. Given the above disclosure, one skilled in the art could devise variations that are within the scope and spirit of the invention disclosed herein, including configurations of the recessed portions and materials and/or designs of the attaching structures. Furthermore, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A standing pipe faucet assembly comprising:
a faucet body having a hollow pipe, a separate body, and a blocking rim stamped and formed at the top edge of the faucet body wherein the separate body is inserted into the faucet body from the bottom thereof, a surrounding orientation engagement is easily obtained; and
the separate body connecting at the upper section of the faucet body having a chamber for installing a water mixing valve and at its lower section having a lateral hole groove disposed on a lateral side, and the lateral hole groove corresponding to the faucet body, wherein the separate body at its predetermined position of the chamber having a cold water inlet and a hot water inlet staggered and isolated from the lateral hole groove and a water outlet passing through the lateral hole groove, a washer being installed and a cap being secured to fix the water mixing valve into the chamber of the separate body of the faucet body, and a water control handle being installed to complete the assembling of the overall standing pipe faucet assembly, wherein the separate body at a predetermined position of its bottom surface of the chamber for installing the water mixing valve has a slantwise threaded hole passing through an adjacent rear portion of the lateral hole groove, an outlet pipe at its rear side installing a separately manufactured hollow tube; wherein the hollow tube having an outer diameter substantially equaling to the diameter of the lateral hole groove, having a length shorter than the depth of the lateral hole groove and a closed rear end having a slantwise blocking groove; the hollow tube coupling to the lateral hole groove at the rear end of the outlet pipe with a bolt screwed in the slantwise threaded hole to combine a terminal end of the bolt and the slantwise blocking groove of the hollow tube, wherein the outlet pipe and the faucet body are coupled tightly together without using the traditional welding technique.

2. The standing pipe faucet assembly as described in claim 1, wherein the lateral hole groove of the separate body at its external section has a diameter expanding groove section and a step surface, wherein the hollow tube connected to the outlet pipe at its predetermined position of the front end has two O-rings, so that when the hollow tube is pushed backwardly by the progress of the bolt screwed in the slantwise threaded hole, the O-rings installed at the predetermined position of the front end of the hollow tube obtaining a hermetically engagement relation with the diameter expanding groove section formed at front end of the lateral hole groove of the separate body, cooperating with the water outlet passing through the separate body and the hollow tube to obtain a predetermined water outlet function.

3. The standing pipe faucet assembly as described in claim 1, wherein the separately manufactured hollow tube at its front side has a screw section for assembling the outlet pipe.

* * * * *